United States Patent
Au et al.

(10) Patent No.: US 10,028,302 B2
(45) Date of Patent: Jul. 17, 2018

(54) SYSTEM AND METHOD FOR UPLINK GRANT-FREE TRANSMISSION SCHEME

(71) Applicant: Huawei Technologies Co., Ltd., Shenzhen (CN)

(72) Inventors: Kelvin Kar Kin Au, Kanata (CA); Hosein Nikopour, Ottawa (CA); Petar Djukic, Ottawa (CA); Zhihang Yi, Ottawa (CA); Alireza Bayesteh, Ottawa (CA); Jianglei Ma, Ottawa (CA); Mohammadhadi Baligh, Kanata (CA); Liqing Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/790,673

(22) Filed: Mar. 8, 2013

(65) Prior Publication Data
US 2014/0254544 A1 Sep. 11, 2014

(51) Int. Cl.
| | |
|---|---|
| H04W 74/08 | (2009.01) |
| H04L 5/00 | (2006.01) |
| H04W 72/02 | (2009.01) |
| H04W 72/04 | (2009.01) |

(52) U.S. Cl.
CPC ........... *H04W 74/08* (2013.01); *H04L 5/0033* (2013.01); *H04W 72/02* (2013.01); *H04W 72/042* (2013.01)

(58) Field of Classification Search
None
See application file for complete search history.

(56) References Cited

U.S. PATENT DOCUMENTS

| | | | |
|---|---|---|---|
| 7,613,157 B2* | 11/2009 | Pan et al. ....................... | 370/341 |
| 9,059,848 B2 | 6/2015 | Larmo et al. | |
| 9,277,454 B2 | 3/2016 | Liao et al. | |
| 2008/0080472 A1 | 4/2008 | Bertrand et al. | |
| 2009/0092086 A1 | 4/2009 | Lee et al. | |
| 2009/0143071 A1* | 6/2009 | Bergstrom et al. ............ | 455/450 |
| 2011/0124357 A1* | 5/2011 | Kim et al. ..................... | 455/507 |
| 2011/0176500 A1* | 7/2011 | Wager et al. .................. | 370/329 |

(Continued)

FOREIGN PATENT DOCUMENTS

| | | |
|---|---|---|
| CN | 1996806 A | 7/2007 |
| CN | 102158932 A | 8/2011 |

(Continued)

OTHER PUBLICATIONS

Huawei Technologies, Inc., "International Search Report and Written Opinion," International Application No. PCT/CN2014/073084, dated Jun. 17, 2014, 12 pages.

(Continued)

*Primary Examiner* — Donald Mills
(74) *Attorney, Agent, or Firm* — Slater Matsil, LLP (57) ABSTRACT

A method embodiment includes implementing, by a base station (BS), a grant-free uplink transmission scheme. The grant-free uplink transmission scheme defines a first contention transmission unit (CTU) access region in a time-frequency domain, defines a plurality of CTUs, defines a default CTU mapping scheme by mapping at least some of the plurality of CTUs to the first CTU access region, and defines a default user equipment (UE) mapping scheme by defining rules for mapping a plurality of UEs to the plurality of CTUs.

23 Claims, 9 Drawing Sheets

(56) References Cited

U.S. PATENT DOCUMENTS

| | | |
|---|---|---|
| 2011/0249632 A1 | 10/2011 | Eriksson et al. |
| 2011/0292895 A1* | 12/2011 | Wager et al. ............... 370/329 |
| 2011/0317563 A1 | 12/2011 | Ishii et al. |
| 2012/0182977 A1* | 7/2012 | Hooli et al. ................ 370/336 |
| 2012/0294269 A1* | 11/2012 | Yamada et al. ............. 370/329 |
| 2013/0010722 A1* | 1/2013 | Suzuki et al. ............... 370/329 |
| 2013/0022012 A1 | 1/2013 | Lee et al. |
| 2014/0192767 A1* | 7/2014 | Au et al. .................... 370/330 |

FOREIGN PATENT DOCUMENTS

| | | |
|---|---|---|
| RU | 2008127310 A | 1/2010 |
| WO | 2007078177 A1 | 7/2007 |
| WO | 2009033280 A1 | 3/2009 |
| WO | 2010057540 A1 | 5/2010 |
| WO | 2010100828 A1 | 9/2010 |
| WO | 2012044240 A1 | 4/2012 |

OTHER PUBLICATIONS

"EXALTED WP3—LTE-M System D3.3 Final report on LTE-M algorithms and procedures," Large Scale Integrating Project, FP7 Contract No. 258512, Jul. 31, 2012, 159 pages.

"Amendment 3: Enhancements for Very High Throughput in the 60 GHz Band, Part 11: Wireless LAN Medium Access Control (MAC) and Physical Layer (PHY) Specifications," IEEE Std 802.11ad™, Dec. 28, 2012, 628 pages.

Wang, X. et al., "Blind Multiuser Detection: A Subspace Approach," IEEE Transactions on Information Theory, vol. 44, No. 2, Mar. 1998, 14 pages.

\* cited by examiner

SYSTEM AND METHOD FOR UPLINK GRANT-FREE TRANSMISSION SCHEME

TECHNICAL FIELD

The present invention relates to a system and method for wireless communications, and, in particular embodiments, to a system and method for uplink grant-free transmission scheme.

BACKGROUND

In a typical wireless network such as long-term evolution (LTE) network, the selection of shared data channels for uplink (UL) is scheduling/grant based, and the scheduling and grant mechanisms are controlled by a base station (BS) in a network. A user equipment (UE) sends an UL scheduling request to the base station. When the BS receives the scheduling request, the BS sends an UL grant to the UE indicating its UL resource allocation. The UE then transmits data on the granted resource.

An issue with this approach is that the signaling resource overhead for the scheduling/grant mechanism can be quite large, especially in cases where the data transmitted is small. For example, for small packet transmissions of around 20 bytes each, the resources used by the scheduling/grant mechanism could be around 30%, or even 50%, of the packet's size. Another issue with this approach is the scheduling/grant procedure causes an initial delay in data transmission. Even when the resources are available, there is a minimum 7-8 ms delay in a typical wireless network between a scheduling request being sent and the first uplink data transmission.

SUMMARY OF THE INVENTION

These and other problems are generally solved or circumvented, and technical advantages are generally achieved, by preferred embodiments of the present invention which provide a system and method for uplink grant-free transmission scheme.

In accordance with an embodiment, a method includes implementing, by a BS, a grant-free uplink transmission scheme. The grant-free uplink transmission scheme defines a first contention transmission unit (CTU) access region in a time-frequency domain, defines a plurality of CTUs, defines a default CTU mapping scheme by mapping at least some of the plurality of CTUs to the first CTU access region, and defines a default user equipment (UE) mapping scheme by defining rules for mapping a plurality of UEs to the plurality of CTUs.

In accordance with another embodiment, a base station (BS) includes a processor, and a computer readable storage medium storing programming for execution by the processor, the programming including instructions to implement a grant-free uplink transmission scheme, receive an uplink transmission from a user equipment (UE), attempt to decode the uplink transmission blindly, and indicate to the UE whether the attempt to decode the uplink transmission blindly was successful. The grant-free uplink transmission scheme defines a plurality of contention transmission units (CTUs), defines one or more CTU access regions in a time-frequency domain, creates a default CTU mapping scheme by mapping the plurality of CTUs to the one or more CTU access regions, and creates a default UE mapping scheme by defining rules for mapping a plurality of UEs to the plurality of CTUs.

In accordance with another embodiment, a method for a grant-free transmission scheme includes implementing, by a user equipment (UE), a default contention transmission unit (CTU) mapping scheme by determining an appropriate CTU for uplink transmission in accordance with a UE mapping rule and the default CTU mapping scheme, and transmitting an uplink transmission, to a base station (BS), on the appropriate CTU.

In accordance with yet another embodiment, a user equipment (UE) includes a processor, and a computer readable storage medium storing programming for execution by the processor, the programming including instructions to implement a default contention transmission unit (CTU) mapping scheme by determining an appropriate CTU for uplink transmission in accordance with a UE mapping rule and the default CTU mapping scheme, and transmitting, to a base station (BS), an uplink transmission on the appropriate CTU, determine whether a collision has occurred based on an indication by the BS, and re-transmit, to the BS, the uplink transmission using an asynchronous hybrid automatic repeat request (HARQ) mechanism when the UE determines a collision has occurred.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Various embodiments are described with respect to a specific context, namely a LTE wireless communication network. Various embodiments may also be applied, however, to other wireless networks such as a worldwide interoperability for microwave access (WiMAX) network.

Figure 1:
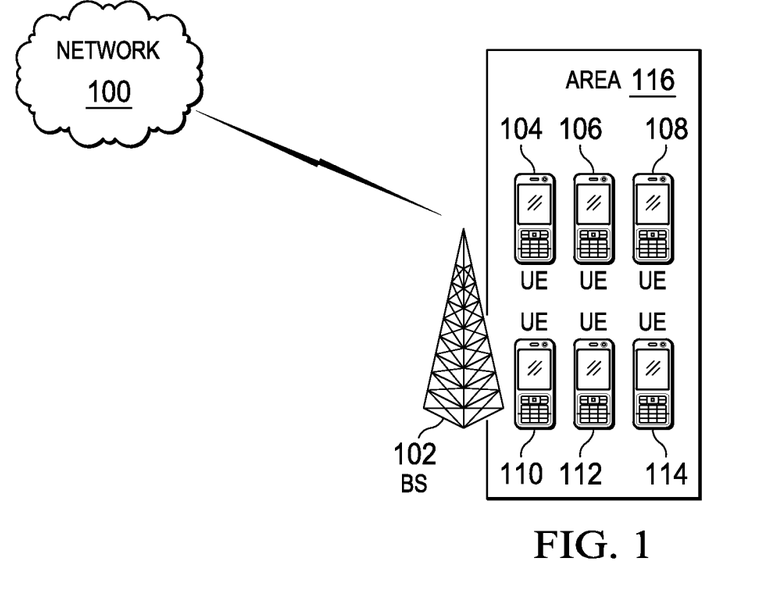
FIG. 1 is a block diagram illustrating a network in accordance with various embodiments.

FIG. 1 illustrates a block diagram of a network 100 according to various embodiments. A base station (BS) 102 manages uplink and downlink communications for various UEs 104-114 within its coverage area 116. BS 102 may alternatively be referred to as a cell tower, an eNodeB, an access network, and the like. BS 102 may support transmissions for multiple cellular carriers concurrently. BS 102 implements a grant-free uplink transmission scheme, wherein contention transmission unit (CTU) access regions are defined so that UEs 104-114 may contend for and access uplink resources without a request/grant mechanism. The grant-free uplink transmission scheme may be defined by the BS, or it may be set in a wireless standard (e.g., 3GPP). UEs 104-114 may be mapped to various CTU access regions to avoid collision (i.e., when two or more UEs attempt to transmit data on the same uplink resource). However, if collision occurs, UEs 104-114 may resolve collisions using an asynchronous HARQ (hybrid automatic repeat request) method. BS 102 blindly (i.e., without explicit signaling) detects active UEs and decodes received uplink transmissions.

Under this scheme, UEs 104-114 may send uplink transmissions without the BS allocating resources to request/grant mechanisms. Therefore, total network overhead resources are saved. Furthermore, this system allows for time savings during uplink by bypassing the request/grant scheme. Although only one BS 102 and six UEs 104-114 are illustrated in FIG. 1, a typical network may include multiple BS each covering transmissions from a varying multitude of UEs in its geographic coverage area.

Network 100 uses various high level signaling mechanisms to enable and configure grant-free transmissions. UEs 104-114 capable of grant-free transmissions signal this capability to BS 102. This allows BS 102 to support both grant-free transmissions and traditional signal/grant transmissions (e.g., for older UE models) simultaneously. The relevant UEs may signal this capability by, for example, RRC (radio resource control) signaling defined in the 3GPP (third generation partnership project) standard. A new field may be added to the UE capability list in RRC signaling to indicate whether the UE supports grant-free transmissions. Alternatively, one or more existing fields can be modified or inferred from in order to indicate grant-free support.

BS 102 also uses high-level mechanisms (e.g., a broadcast channel or a slow signaling channel) to notify UEs 104-114 of information necessary to enable and configure a grant-free transmission scheme. For example, BS 102 may signal that it supports grant-free transmissions, its search space and access codes for CTU access regions, a maximum size of a signature set (i.e., the total number of signatures defined), a modulation and coding scheme (MCS) setting, and the like. Furthermore, BS 102 may update this information from time to time using, for example, a slow signaling channel (e.g., a signaling channel that only occurs in the order of hundreds of milliseconds instead of occurring in every TTI).

BS 102 implements a grant-free uplink transmission scheme. The grant-free transmission uplink scheme defines CTU access regions to enable grant-free transmissions by UE 104-114. A CTU is a basic resource, predefined by network 100, for contention transmissions. Each CTU may be a combination of time, frequency, code-domain, and/or pilot elements. Code-domain elements may be CDMA (code division multiple access) codes, LDS (low-density signature) signatures, SCMA (sparse code multiple access) codebooks, and the like. These possible code-domain elements are referred to generically as "signatures" hereinafter. Multiple UEs may contend for the same CTU. The size of a CTU is preset by the network and may take into account an expected transmission size, the amount of desired padding, and/or MCS levels.

A CTU access region is a time-frequency region where contention transmission occurs. The grant-free uplink transmission scheme may define multiple CTU access regions for network 100. The grant-free transmission uplink scheme may be defined by BS 102 via high level signaling (e.g., through a broadcast channel) or it may be pre-defined by a standard and implemented in UEs (e.g., in a UE's firmware). The regions may exist in one or more frequency bands (intra-band or inter-band) and may occupy the entire uplink transmission bandwidth or a portion of the total transmission bandwidth of BS 102 or a carrier supported by BS 102. A CTU access region that occupies only a portion of the bandwidth allows BS 102 to simultaneously support uplink transmissions under a traditional request/grant scheme (e.g., for older UE models that cannot support grant-free transmissions). Furthermore, BS 102 may utilize unused CTUs for scheduled transmissions under a request/grant scheme, or BS 102 may adjust the size of CTU access regions if portions of the access regions are not used for a period of time. Furthermore, the CTU access regions may frequency hop periodically. BS 102 may signal these changes in CTU access region size and frequency to UEs 104-114 through a slow signaling channel.

Figure 2:
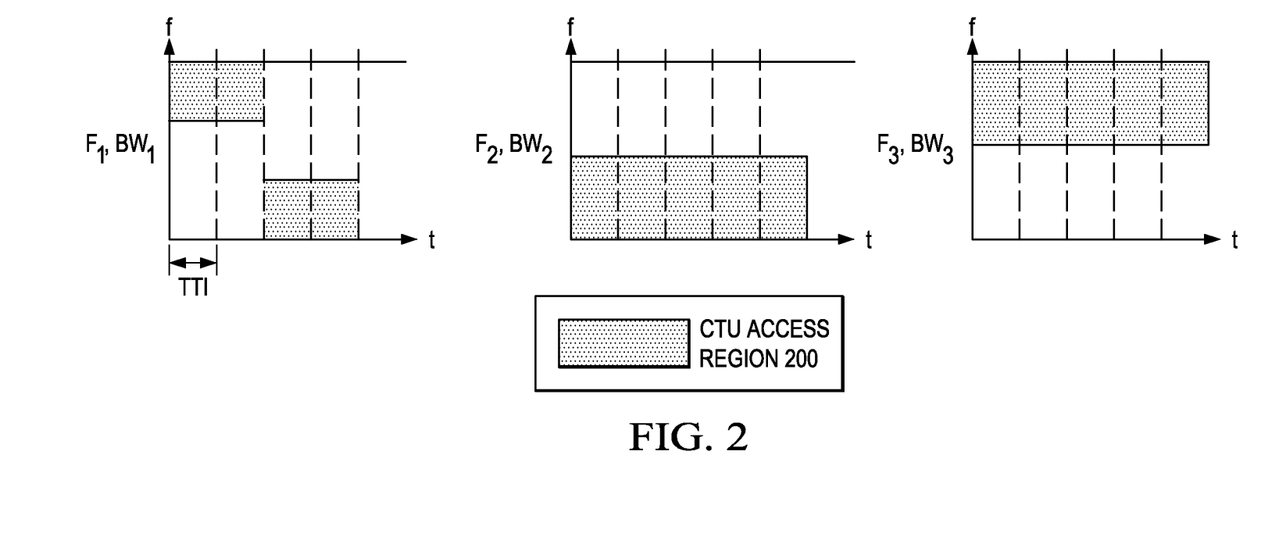
FIG. 2 is a diagram illustrating an example configuration of various contention transmission (CTU) access regions in accordance with various embodiments.

FIG. 2 illustrates an example configuration for various CTU access regions defined by BS 102. In FIG. 2, BS 102 supports transmissions for three carriers each operating at frequencies $F_1$, $F_2$ and $F_3$ with bandwidth $BW_1$, $BW_2$ and $BW_3$. FIG. 2 illustrates example CTU access regions 200 defined in all three carriers using different configurations. The configurations shown in FIG. 2 are for illustrative purposes only, and alternative CTU access region configurations may be defined in various embodiments.

Multiple CTU access regions (e.g., as illustrated in FIG. 2) allow each CTU access region to be categorized differently to provide different types of service to varying UE types. For example, the CTU access regions may be categorized to support different quality of service (QoS) levels, different UE configurations (e.g., in situations of carrier aggregation), different UE subscribed levels of service, different UE geometries, or a combination thereof. Furthermore, each CTU access region may be configured to support a different number of UEs. The size of each CTU access region may vary depending on the expected number of UEs using the region. For example, the size of a CTU access region may be based the history of loading in the CTU access region (such as the number of UEs), UE collision probability estimations, and/or measured UE collisions over a period of time.

Figure 3:
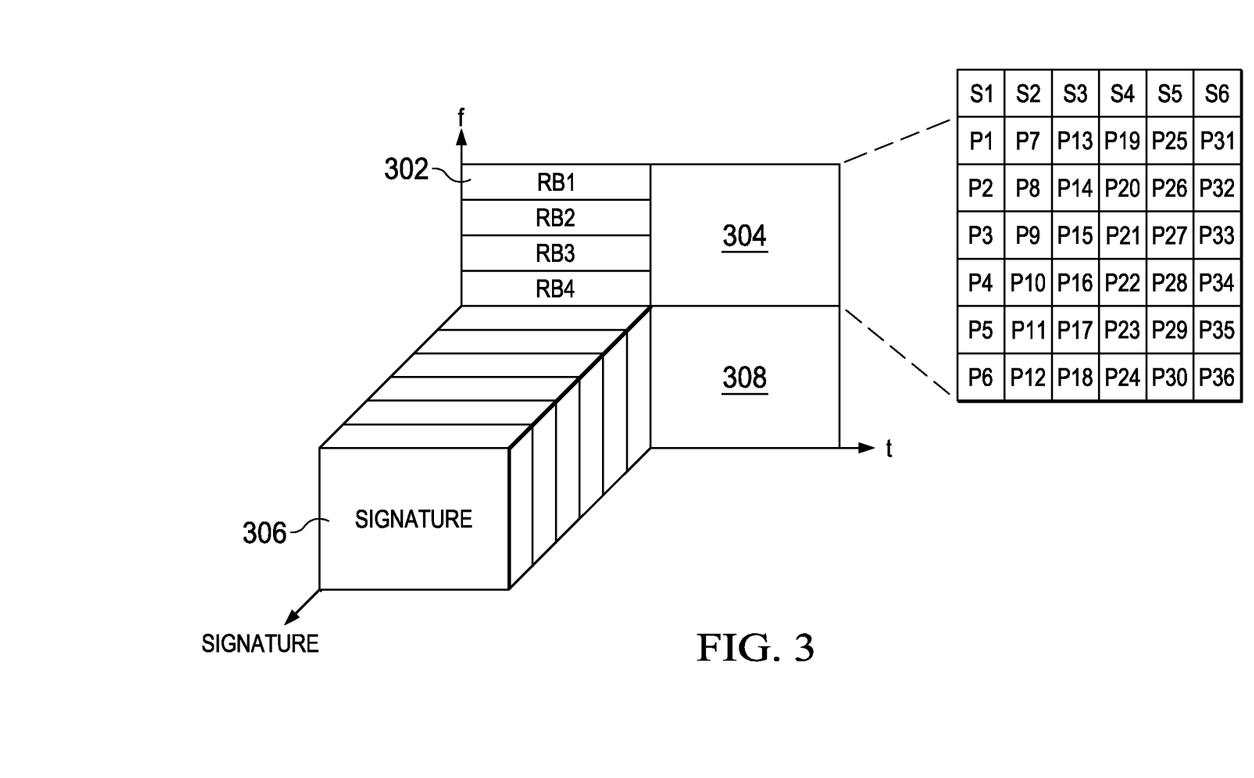
FIG. 3 is a diagram illustrating an example mapping of CTUs to CTU access regions in accordance with various embodiments.

FIG. 3 illustrates an example CTU resource definition in various CTU access regions. FIG. 3 illustrates four CTU access regions 302-308. The available bandwidth is divided into time-frequency regions for CTU access region 302-308, with each access region 302-308 occupying a predefined number of resource blocks (e.g., access region 302 occupies RBs 1-4) of bandwidth. In FIG. 3, CTUs are mapped identically to access regions 302-308, but varying views of this mapping are shown for illustrative purposes.

In FIG. 3, each CTU access region is capable of supporting up to thirty-six UEs contending for the thirty-six CTUs defined in each region. Each CTU is a combination of time, frequency, signature, and pilot. Each access region 302-308 occupies a distinct frequency-time region. These frequency-time regions are further broken down to each support six signatures ($S_1$-$S_6$) and six pilots mapped to each signature to create thirty-six total pilots ($P_1$-$P_{36}$). A pilot/signature decorrelator at BS 102 is used to detect and decode individual UE signals and transmissions.

Therefore, under this scheme different UEs conduct uplink transmissions on the same signature. Various embodiments support signature collisions (i.e., when several UEs simultaneously access the same frequency-time resources by using the same signature). In the known art, it was previously believed that signature collisions irreparably degrade UE performance and should be absolutely avoided. However, it has been observed that while signature collisions may degrade UE performance, the transmitted information can still be decoded by BS 102 using various decoding schemes (e.g., a JMPA scheme as described in detail in subsequent paragraphs). Furthermore, it has also been observed that signature collisions between two UEs (e.g., UEs 104 and 106) do not affect the performance of other UEs (e.g., UEs 108-114). Therefore, signature collisions are not detrimental to overall system performance. Various embodiments map multiple potential UEs to the same frequency-time-signature resource so that, at each contention transmission, the system may be fully loaded.

In contrast, pilot collisions may not be supported. Similar to signature collision, pilot collision refers to cases when multiple UEs simultaneously access the same frequency-time-signature resources by using the same pilot sequence. However, unlike signature collisions, pilot collisions may lead to irreparable results in a grant-free transmission scheme. This is due to BS 102 being unable to decode a UE's transmission information in pilot collision scenarios because BS 102's is unable to estimate the individual channels of UEs using the same pilot. For example, assume two UEs (UE 104 and 106) have the same pilot and their channels are $h_1$ and $h_2$, then BS 102 can only estimate a channel of quality of $h_1+h_2$ for both UEs 104 and 106. Thus, the transmitted information will not be decoded correctly. Various embodiments may define a number of unique pilots (e.g. thirty-six pilots per access region in FIG. 3) depending on the number of UEs supported in the system. The specific numbers given in FIG. 3 are for illustrative purposes only, and the specific configuration of the CTU access regions and CTUs may vary depending on the network.

Various embodiments enable grant-free transmissions through the inclusion of mechanisms for collision avoidance through UE to CTU mapping/re-mapping and collision resolution through asynchronous HARQ. For a UE to successfully perform uplink transmissions in a grant-free scheme, the UE must determine a CTU on which data can be sent. A UE determines the CTU it should use for transmissions based on predefined mapping rules known by both the UE (e.g., UEs 104-114) and the base stations (e.g., BS 102) in a network (e.g., network 100). These mapping rules may be implicit (i.e., default) rules pre-defined for the UE (e.g. in an applicable standard or in the firmware of the UE) and/or explicit rules defined by a BS using high level signaling. For example, different mapping rules (as referred to as mapping configurations) are pre-defined in a wireless standard, such as 3GPP, and the index of the applicable mapping configuration is signaled to a UE by the BS.

The grant-free uplink transmission scheme assigns a unique, identifying CTU index, $I_{CTU}$, to each CTU in the CTU access regions. UEs determine which CTUs to transmit on based on mapping rules for choosing an appropriate CTU index. The mapping of CTU indexes may be distributed uniformly over the available resources taking into account the size of the CTU regions over the time-frequency domain and the desire to reduce BS decoding complexity. The size of the CTU regions is taken into account so that UEs are not mapped to the same subset of available time-frequency resources.

Figure 4:
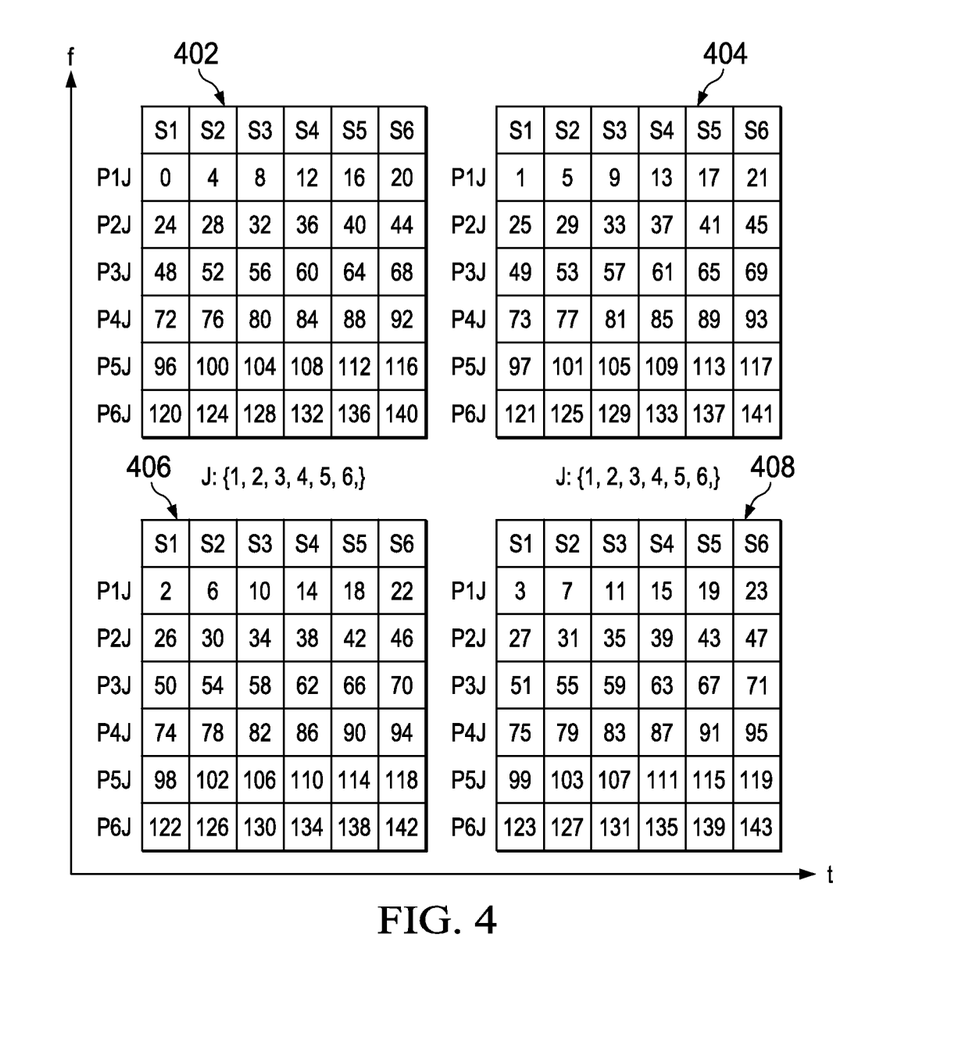
FIG. 4 is a diagram illustrating an example CTU index numbering in accordance with various embodiments.

For example, FIG. 4 illustrates such a distribution of CTU indexes over the CTU access regions. Each signature-pilot grid 402-408 corresponds to a time-frequency access region 302-308 from FIG. 3. As shown in FIG. 4, indexes are distributed in the following order: time, frequency, signature, and then pilot. For example, index 0 is mapped to a first time and a first frequency. Index 1 is then mapped to a second time in the first frequency. Index 2 is mapped to the first time in a second frequency, and index 3 is mapped to the second time in the second frequency. Only when all the time-frequency combinations are exhausted is the next index (index 4) mapped to a different signature in the first time and first frequency. In this manner all 144 CTU indexes (i.e., four access regions multiplied by thirty-six pilots per region) are mapped to distribute UEs over the region and reduce the chance of signature and pilot collision. Various alternative embodiments may use different mapping rules for CTU index mapping.

The inclusion of default mapping rules allows a UE to automatically transmit data on the mapped CTU as soon as it enters a BS's coverage area without additional signaling. These default mapping rules may be based on a UE's dedicated connection signature (DCS), its DCS index assigned by a BS, the total number of CTUs, and/or other parameters such as subframe number. For example, a UE i may map to a CTU resource index, $I_{CTU}$ based on a default formula:

$$I_{CTU} = DSC_i \bmod N_{CTU}$$

wherein $N_{CTU}$ represents the total number of available CTU indexes (e.g., 144 in the examples given in FIGS. 3-4) and $DSC_i$ is the DSC index of UE i.

A UE's DCS index may be assigned to the UE by a BS via high level signaling (e.g., through a broadcast, multicast, or unicast channel). Furthermore, this DCS index number may be used in conjunction with CTU index mapping to evenly distribute UEs across the CTU access regions. For example, when a UE enters a BS's (e.g., BS 102) coverage area, the BS may receive notice of the UE entering its area. BS 102 may assign a DCS index (hence the DSC) to the UE. For example, the first UE is assigned $DCS_1=0$, the second UE is assigned $DCS_2=1$, the third UE is assigned $DCS_3=2$, and so on. When the UE maps to a CTU resource based on a default mapping formula (e.g., $I_{CTU}=DSC_i \bmod N_{CTU}$), the UEs will be assigned indexes based on their DCS index and the total number of CTUs. By combining this mapping formula with the appropriate CTU index mapping (e.g., FIG. 4), the UEs may be distributed evenly across the CTU access regions. That is, the first UE will be mapped to index 0, the second UE will be mapped to index 1, etc.

Figure 5A:
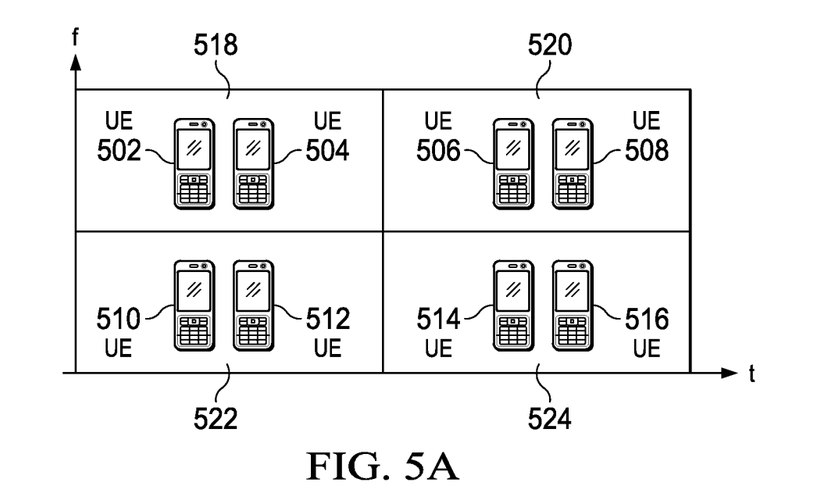
FIGS. 5A and 5B are diagrams illustrating an example UE mapping and remapping in accordance with various embodiments.
Figure 5B:
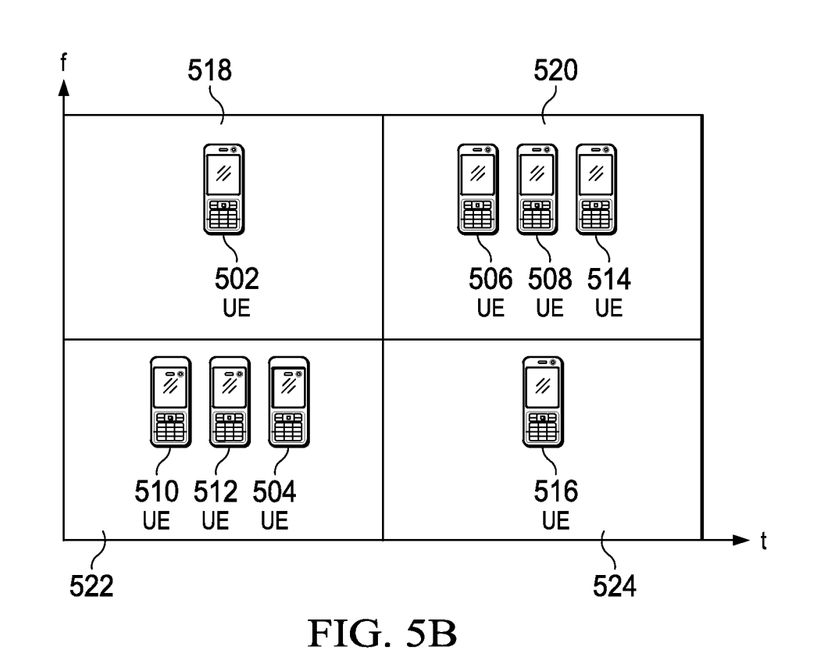

A subset of UEs may be re-mapped periodically by the network to reduce collisions. UEs may be remapped in cases when UEs exchange packets frequently in a data session (referred to as active UEs). These active UEs may experience higher probabilities of collision when they are unevenly distributed across the available CTU access regions. For example, FIG. 5A illustrates various UEs 502-516 mapped to four CTU access regions 518-524 under default mapping rules. In FIG. 5A, UEs 502, 504, 514, and 516 are active UEs mapped to two of the four available CTU access regions, increasing their probability for collision. A BS associated with the UEs (e.g., BS 102) determines that the default mapping is causing too many collisions and remaps certain UEs (e.g., UE 504 and 514) to the other CTU access regions as shown in FIG. 5B. BS 102 may detect the high level of collisions through high level signaling from the UEs or through repeated failed attempts to decode transmitted information (i.e., as previously discussed, pilot collisions cause failed attempts to decode transmission data). Alternatively, active UEs may be initially mapped to the same CTU in an access region. When the BS determines collisions are occurring due to this mapping, the active UEs may be re-mapped to different CTUs in the same access region. The various UEs 502-516 may revert to default mapping rules either implicitly when the UEs are no longer active or explicitly through network signaling. In alternative embodiments, this type of temporary re-mapping may also be used to provide certain UEs with dedicated resources for very time-sensitive transmissions when requested by the UE or configured by the network.

By implementing the described UE mapping strategies, the number of initial collisions in a CTU access region may be controlled. However, collisions may still occur and must be resolved. When transmissions are successful, the UE will be notified by the BS through, for example, an ACK (acknowledgement) signal. The BS only sends the ACK signal when transmissions are successful. Therefore, if a UE does not receive an ACK signal within a predetermined time period, the UE determines that collision has occurred. Alternatively, the BS may receive an NACK (negative acknowledgement)] signal when the transmission fails. The UE assumes transmission was successful unless it receives a NACK.

When collisions occur, they are resolved using asynchronous HARQ methods. Asynchronous HARQ methods differ from synchronous HARQ methods in that the UE does not attempt to retransmit on the same CTU when collision occurs. Rather the UE may choose a different CTU to retransmit on. For example, a random backoff procedure may be implemented. Each UE picks a backoff time period (e.g., a next TTI) randomly within a contention window to retransmit data. At the next TTI, the UE transmits data. The contention window size is a system parameter that may be signaled to the UE using high-level signaling.

When BS 102 receives transmitted information, it blindly decodes the transmitted information (referred to as blindly because BS 102 does not know which UE transmitted the information or which UEs are active in a network). For example, BS 102 may use JMPA (joint signature and data detection using MPA (message passing algorithm)) methods to blindly decode the transmitted information. Generally, MPA methods rely on channel knowledge and user-specific information to detect and decode data. JMPA initially assume all possible users might be active. It then iteratively detects the active users and simultaneously tries to detect their transmitted data. At the end of the iteration, among the all possible user pool, a list of active users and their detected data are provided by JMPA. A detailed description of a JMPA system and method may be found in U.S. Provisional Application No. 61/737,601, filed on Dec. 14, 2012, entitled "System and Method for Low Density Spreading Modulation Detection," which application is hereby incorporated herein by reference.

Figure 6:
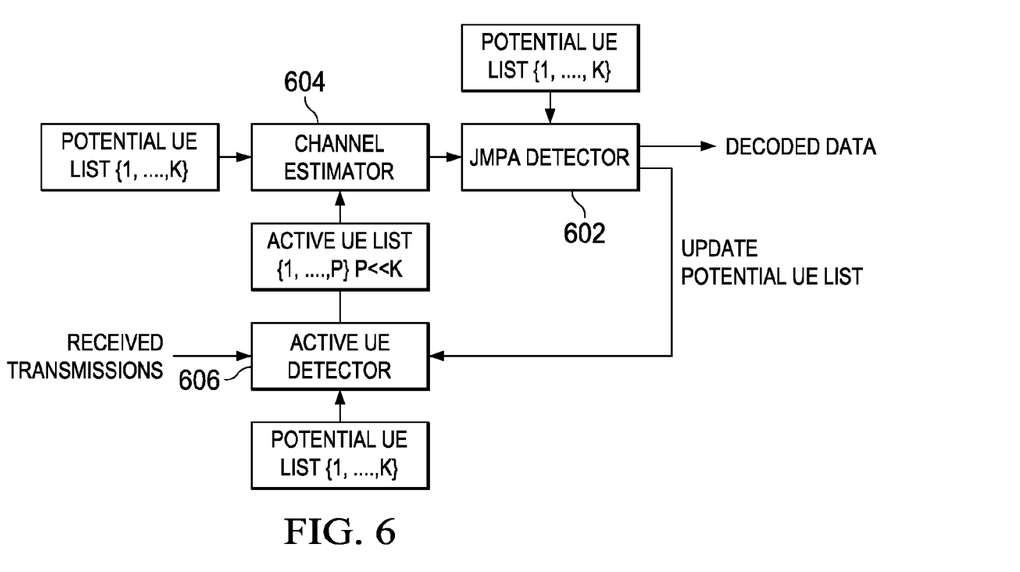
FIG. 6 is a block diagram of a joint signature and data detection using message passing algorithm method with an active UE detector in accordance with various embodiments.

An issue with this JMPA approach is that the original user pool might be very large to start with. It may make the complexity of the JMPA process impractically high. FIG. 6 illustrates a block diagram of a JMPA detector 602, channel estimator 604, with an active UE detector 606 to simplify the potentially high complexity of the JMPA process. A list of all potential UEs is fed into JMPA detector 602, channel estimator 604, and active UE detector 606. Active UE detector 606 uses the list of all potential UEs and received transmission data (e.g., all transmissions received by the BS from the CTU access regions) to generate a smaller list of potential active UEs. For example, as previously discussed multiple pilots may be correlated with each signature. Therefore, if active UE detector 606 determines a signature is not active, all corresponding pilots (i.e., CTU indexes/potential UEs) correlated with the inactive signature are also inactive. These pilots are removed from the list of potential UEs. If active UE detector 606 determines a pilot is inactive, it is taken off the list as well. In this manner, active UE detector 606 may decrease the list of potential active UEs for channel estimator 604 and JMPA detector 602, simplifying the decoding process. Furthermore, JMPA detector 602 may feed an updated list of potentially active UEs back to active UE detector 606. For example, JMPA detector 602 may determine that a second signature is inactive; this information is fed back to active UE detector 606 so that the corresponding pilots related to the second signature may be eliminated from the list of potential UEs.

Typically, uplink transmission performance depends on the number of the active signatures. A fewer number of overlaid signatures correlates to better expected performance from a MPA detector, such as the JMPA detector. This idea can be used to implicitly control the uplink quality. Based on long-term traffic statistics and the number of the potential active users, the network can statistically control the average number of the users transmitting within the same CTU access region. For example, different numbers of UEs can be grouped together to access different CTU access regions. The network can also limit the number of pilots and/or signatures in a CTU access region. If the channel quality of the UEs is historically good, more interference within a CTU access region may be tolerated (i.e., more of these UEs can be configured to access a CTU access region allow for more pilots and/or signatures to be defined). This long-term link-adaptation mechanism is controlled by the network through the defining of CTU access regions and the mapping of UEs to access regions.

Figure 7A:
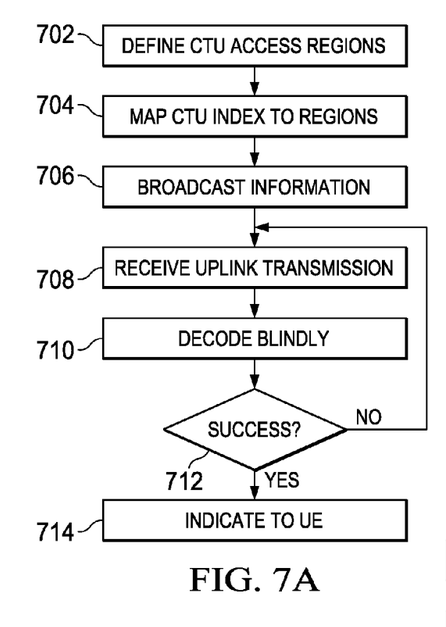
FIGS. 7A and 7B are flow diagrams of base station (BS) activity in accordance with various embodiments.

FIG. 7A illustrates a flow diagram of network activity (e.g., through BS 102) according to various embodiments. In step 702, BS 102 defines CTU access regions. In step 704, BS 102 maps various CTU indexes to the CTU access region. Each CTU index corresponds to a CTU a UE (e.g., UE 104) may perform grant-free transmissions on. In step 706, BS 102 uses high-level signaling (e.g., through a broadcast channel) to send information enabling grant-free transmissions. This high-level signaling includes information on the defined CTU access regions, number of CTUs in the access regions and/or CTU index map. The high-level signaling may also include assigned DCS index information, and the like.

Steps 702-706 illustrate BS 102 defining and implementing a grant-free uplink transmission scheme. Alternatively, BS 102 may perform none or a subset of steps 702-706 because certain steps are pre-configured for BS 102 by a standard. For example, a standard may eliminate step 702 by pre-defining CTU access regions. BS 102 need only perform steps 704 and 706 (i.e., mapping CTU indexes to the CTU access regions and transmitting information). In another example, a standard defines the grant-free uplink transmission scheme and BS 102 need only implement the grant-free uplink transmission scheme.

In step 708, BS 102 receives an uplink transmission from UE 104. In step 710, the BS decodes the uplink transmission information blindly using, for example, a JMPA and active UE detector method. In step 712, BS 102 determines whether the decoding was successful. If not, BS 102 assumes that collision has occurred, and waits to receive another uplink transmission. BS 102 also indicates to UE 104 whether the decoding was successful. BS 102 may do this by sending an ACK signal only if the transmission is successfully decoded. Alternatively, BS 102 may send a NACK signal if the transmission was not successfully decoded.

Figure 7B:
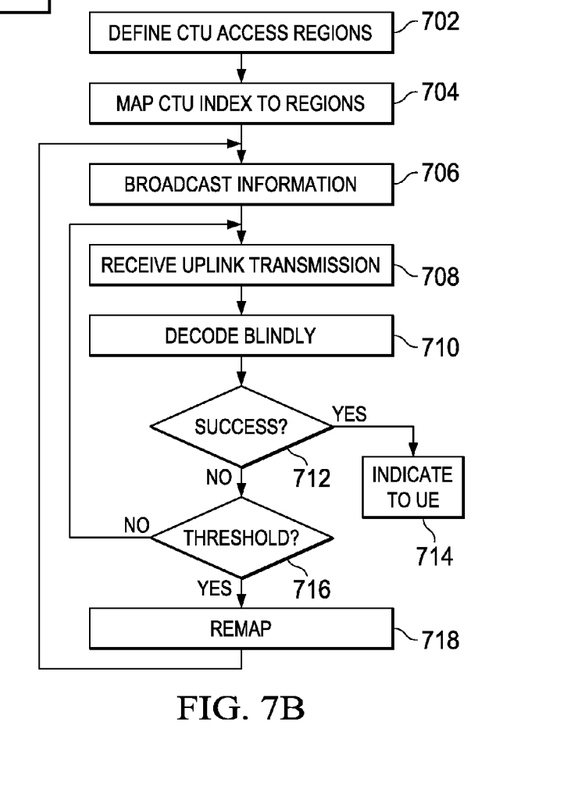

In an alternative embodiment illustrated in FIG. 7B, if decoding was not successful in step 712, BS 102 determines if the number of failed decodings (i.e., collisions) is above a certain configurable threshold. If not, BS 102 waits for the next transmission. If the number of failures meets a certain threshold, BS 102 uses this information and overall conditions (e.g. distribution of active UEs in the CTUs) to make decision on remapping the UEs to other CTU indexes in the same or a different CTU access region in step 718. BS 102 then returns to step 706 to send the remapped CTU information via high-level signaling (e.g., broadcast, multicast, or unicast) to the UEs in its coverage area.

Figure 8A:
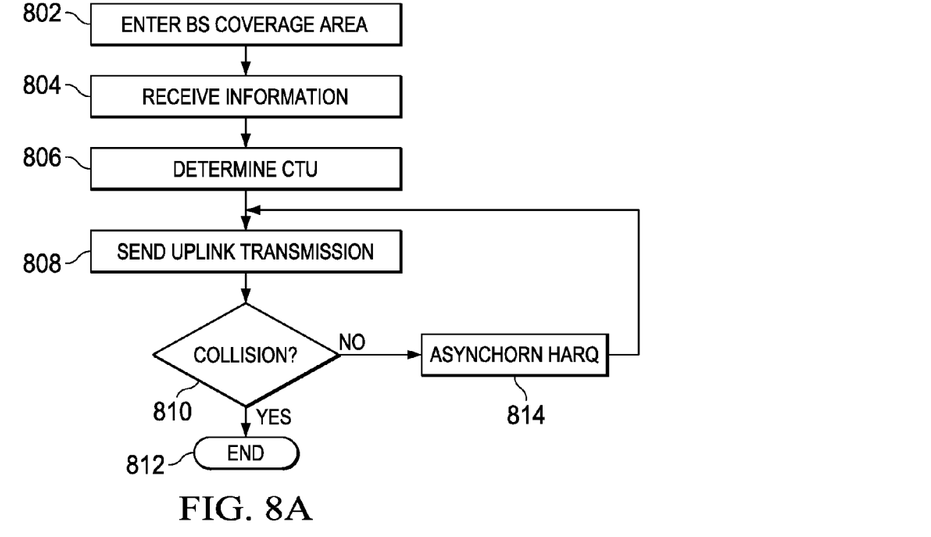
FIGS. 8A and 8B are flow diagrams of user equipment (UE) activity in accordance with various embodiments.

FIG. 8A illustrates a flow diagram of UE activity in accordance with various embodiments. In step 802, UE (e.g., UE 104) enters a BS's coverage area. In step 804, UE 104 receives high-level signaling information from the BS. This high level signaling information includes CTU access region definitions, total number of CTUs, default mapping rules, and the like. Alternatively, UE 104 may be preconfigured with default mapping rules. In step 806, UE 104 determines an appropriate CTU to conduct uplink transmissions on (e.g., UE 104 may determine an appropriate CTU index using default mapping rules).

In Step 808, UE 104 transmits information on the appropriate CTU. In step 810, UE 104 determines whether collision has occurred based on an indication from the BS. For example, the UE may wait a predetermined amount of time for an ACK signal. If an ACK signal is received, then in step 812, the uplink procedure is concluded and UE 104 moves on to its next task. If no ACK signal is received, UE 104 determines that collision has occurred, and moves to step 814. In step 814, UE 104 resolves the collision using an asynchronous HARQ method. Alternatively, UE 104 assumes no collision has occurred unless it receives a NACK. If a NACK is received, the UE then continues with the collision resolution procedure.

Figure 8B:
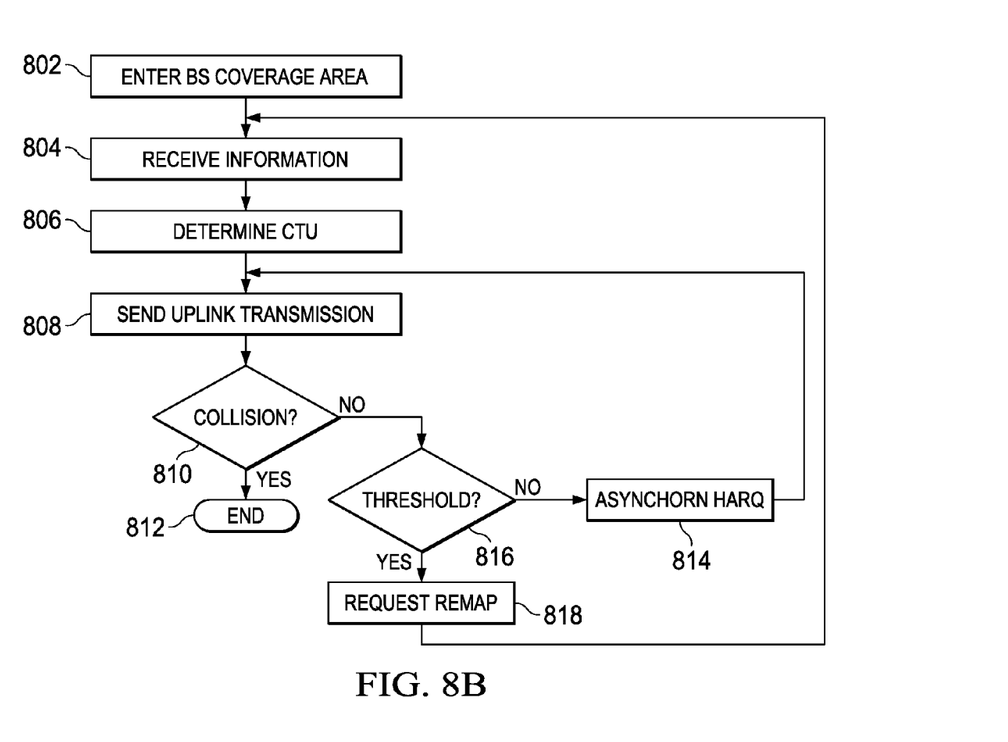

In an alternative embodiment illustrated in FIG. 8B, if UE 104 determines collision has occurred, UE 104 then determines if the number of collisions exceed a certain threshold. If not, then UE 104 returns to step 814 and resolves the collision using an asynchronous HARQ method. If the threshold is met, then in step 818, UE 104 may request remapping of CTUs by the BS. UE 104 then returns to step 804 and waits to receive the remapping information form the BS and proceed with the uplink procedure. In another embodiment, step 818 is optional and UEs do not send a request for remapping. The decision whether to remap UEs is made by the BS based on aggregate information on the collisions of UEs in the CTUs. UE 104 may continue to try to resolve the collision using an asynchronous HARQ method.

Figure 9:
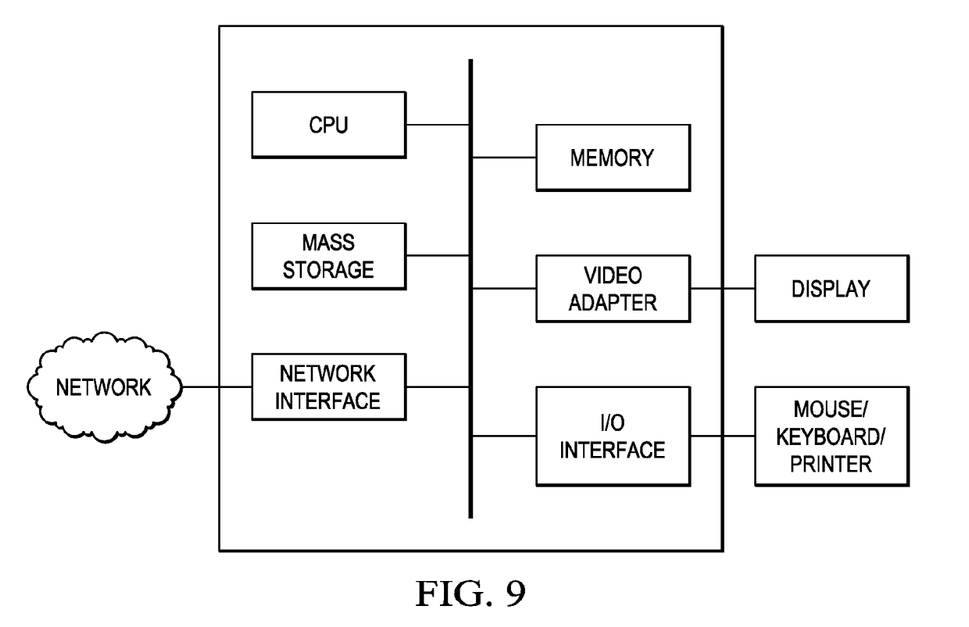
FIG. 9 is a block diagram illustrating a computing platform that may be used for implementing, for example, the devices and methods described herein, in accordance with an embodiment.

FIG. 9 is a block diagram of a processing system that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

In a first embodiment, a method is provided. The method includes: implementing, by a base station (BS), a grant-free uplink transmission scheme, wherein the grant-free uplink transmission scheme: defines a first contention transmission unit (CTU) access region in a time-frequency domain; defines a plurality of CTUs; defines a default CTU mapping scheme by mapping at least some of the plurality of CTUs to the first CTU access region; and defines a default user equipment (UE) mapping scheme by defining rules for mapping a plurality of UEs to the plurality of CTUs.

In a second embodiment, the method may further include: defining, by the BS, at least a portion of the grant-free uplink transmission scheme; and transmitting the portion of the grant-free uplink transmission scheme defined by the BS using high-level signaling.

In a third embodiment, at least a portion of the grant-free uplink transmission scheme is pre-configured on the BS in conformance with a standard.

In a fourth embodiment, implementing the grant-free transmission uplink scheme further includes: receiving, by the BS, an uplink transmission from a user equipment (UE); attempting to decode the uplink transmission blindly; and indicating, to the UE, whether the attempting to decode the uplink transmission blindly was successful.

In a fifth embodiment, the grant-free uplink transmission scheme further defines a second CTU access region in the time-frequency domain and further defines the default mapping scheme by mapping the multitude of CTUs to the first and second CTU access regions, and wherein the implementing the grant-free transmission uplink scheme further includes: defining, by the BS, a CTU remapping scheme by remapping a portion of the plurality of CTUs to the first and second CTU access regions when the BS determines a number of collisions is too frequent, wherein the BS determines the number of collisions is too frequent when: the BS determines a number times attempting to decode the uplink transmission blindly was unsuccessful and the number of times is over a threshold; or the BS receives a remapping request signal from the UE; and sending information related to the remapping scheme using high-level signaling.

In a sixth embodiment, the default UE mapping scheme maps the UE to a first CTU, the first CTU being one of the plurality of CTUs, and wherein implementing the grant-free transmission uplink scheme further includes: defining, by the BS, a UE remapping scheme by mapping the UE to a second CTU, the second CTU being one of the plurality of CTUs other than the first CTU, when the BS determines a number of collisions is too frequent, wherein the BS determines the number of collisions is too frequent when: the BS determines a number times attempting to decode the uplink transmission blindly was unsuccessful and the number of times is over a threshold; or the BS receives a remapping request signal from the UE; and sending information related to the UE remapping scheme using high-level signaling.

In a seven embodiment, attempting to decode the uplink transmission blindly includes using a joint signature and data detection using a message passing algorithm (JMPA) method in combination with an active UE detector method, wherein the active UE detector method comprises: receiving a list of all potential UEs; receiving a multitude of signals transmitted over the time-frequency domain; receiving an output, from the JMPA method, comprising an updated list of potential UEs, wherein the updated list includes fewer potential UEs than the list of all potential UEs; and creating an active potential UE list in accordance with the multitude of signals and the updated list of potential UEs.

In an eighth embodiment, the grant-free uplink transmission scheme defines a number of unique pilots for grant-free uplink transmissions.

In a ninth embodiment, a base station (BS) is provided, comprising a processor; and a computer readable storage medium storing programming for execution by the processor, the programming including instructions to: implement a grant-free uplink transmission scheme, wherein the grant-free uplink transmission scheme: defines a plurality of contention transmission units (CTUs); defines one or more CTU access regions in a time-frequency domain; creates a default CTU mapping scheme by mapping the plurality of CTUs to the one or more CTU access regions; and creates a default UE mapping scheme by defining rules for mapping a plurality of UEs to the plurality of CTUs; receive an uplink transmission from a user equipment (UE); attempt to decode the uplink transmission blindly; and indicate to the UE whether the attempt to decode the uplink transmission blindly was successful.

In a tenth embodiment, the plurality of CTUs includes individual CTUs each defined as a time, frequency, signature, pilot, or a combination thereof element.

In an eleventh embodiment, each CTU is defined as a combination of time, frequency, signature, and pilot elements, and the grant-free uplink transmission scheme maps multiple pilot elements to each signature element.

In a twelfth embodiment, the grant-free uplink transmission scheme defines a plurality of CTU access regions, the plurality of CTU access regions each provide a type of service to the UE based on quality of service (QoS) level of the UE, configuration, subscribed level of service, geometry, or a combination thereof.

In a thirteenth embodiment, a size of each of the one or more CTU access regions is defined based on an estimated probability of collisions, a number of total collisions over a period of time, a number of UEs supported by the BS, or a combination thereof. In a fourteenth embodiment, a size of each of the plurality of CTUs is defined based on an expected transmission threshold, a desired padding level, a modulation coding scheme (MCS) level, or a combination thereof. In a fifteenth embodiment, the grant-free uplink transmissions scheme creates a default CTU mapping in accordance with goals of distributing potential UEs uniformly over the one or more CTU access regions and reducing a probability of pilot collision.

In a sixteenth embodiment, a method for a grant-free transmission scheme is provided. The method includes: implementing, by a user equipment (UE), a default contention transmission unit (CTU) mapping scheme by: determining an appropriate CTU for uplink transmission in accordance with a UE mapping rule and the default CTU mapping scheme; and transmitting an uplink transmission, to a base station (BS), on the appropriate CTU.

In a seventeenth embodiment, the method further includes: after sending an uplink transmission, determining, by the UE, whether a collision has occurred based on an indication by the BS; and resolving the collision using an asynchronous hybrid automatic repeat request (HARM) method when the UE determines a collision has occurred.

In an eighteenth embodiment, the method further includes transmitting, by the UE, a remapping request to the BS using high-level signaling when the UE determines a number of collisions have occurred and the number of collisions is above a threshold.

In a nineteenth embodiment, a user equipment (UE) is provided. The UE includes: a processor; and a computer readable storage medium storing programming for execution by the processor, the programming including instructions to: implement a default contention transmission unit (CTU) mapping scheme by: determining an appropriate CTU for uplink transmission in accordance with a UE mapping rule and the default CTU mapping scheme; and transmitting, to a base station (BS), an uplink transmission on the appropriate CTU; determine whether a collision has occurred based on an indication by the BS; and re-transmit, to the BS, the uplink transmission using an asynchronous hybrid automatic repeat request (HARQ) mechanism when the UE determines a collision has occurred.

In a twentieth embodiment, the UE mapping rule includes information for determining an appropriate CTU in accordance with a dedicated connection signature (DCS) of the UE, a DCS index, a total number of CTUs in the default CTU mapping scheme, a subframe number, or a combination thereof.

In a twenty first embodiment, the UE mapping rule includes information for determining an appropriate CTU index corresponding to an index in the default CTU mapping scheme in accordance with: $I_{CTU}=DSC_i \mod N_{CTU}$, wherein $I_{CTU}$ is a CTU index, $DSC_i$ is a DCS index assigned to the UE by the BS, and $N_{CTU}$ is a total number of CTUs in the CTU mapping scheme. In a twenty second embodiment, the UE mapping rule is pre-configured on the UE. In a twenty third embodiment, the UE is configured to receive the UE mapping rule from the BS.

What is claimed is:

1. A method comprising:
   implementing, by a base station (BS), a grant-free uplink transmission scheme, wherein the grant-free uplink transmission scheme:
   defines a first contention transmission unit (CTU) access region, the first CTU access region being a time-frequency region in a time-frequency domain;
   defines a default CTU mapping scheme by mapping at least some of a plurality of CTUs to the first CTU access region, each of the plurality of CTUs being a combination of at least time, frequency and pilot;
   defines a default user equipment (UE) mapping scheme for pre-mapping a first UE to a first CTU in the plurality of CTUs and a second UE to a second CTU in the plurality of CTUs, the second CTU being different than the first CTU;
   receiving, by the BS from the first UE, an uplink data transmission performed according to the grant-free uplink transmission scheme, the uplink data transmission being received on the first CTU that is pre-mapped to the first UE without using a resource request/grant mechanism; and
   decoding, by the BS, the uplink data transmission blindly.

2. The method of claim 1, further comprising:
   transmitting, by the BS, at least a portion of the grant-free uplink transmission scheme using high-level signaling.

3. The method of claim 1, wherein decoding the uplink data transmission blindly comprises blindly identifying a source of the uplink data transmission, and wherein the method further comprises:
   indicating, to the first UE, that decoding the uplink data transmission blindly was successful.

4. The method of claim 3,
   wherein the grant-free uplink transmission scheme further defines a second CTU access region having a second time-frequency region in the time-frequency domain, and further defines the default CTU mapping scheme by mapping the plurality of CTUs to the first and second CTU access regions;
   wherein the grant-free transmission uplink scheme further defines a CTU remapping scheme that remaps a portion of the plurality of CTUs to the first and second CTU access regions when a number of collisions is too frequent, wherein the number of collisions is too frequent when the BS determines a number times attempting to decode transmissions blindly was unsuccessful and the number of times is over a threshold, or when the BS receives a remapping request signal from the first UE; and
   wherein the method further comprises sending information related to the CTU remapping scheme using high-level signaling.

5. The method of claim 3, wherein implementing the grant-free transmission uplink scheme further comprises:
   defining, by the BS, a UE remapping scheme by mapping the first UE to a third CTU, the third CTU being one of the plurality of CTUs other than the first CTU, when the BS determines a number of collisions is too frequent, wherein the BS determines the number of collisions is too frequent when:
   the BS determines a number times attempting to decode transmissions blindly was unsuccessful and the number of times is over a threshold; or
   the BS receives a remapping request signal from the first UE; and
   sending information related to the UE remapping scheme using high-level signaling.

6. The method of claim 1, wherein decoding the uplink data transmission blindly comprises using a joint signature and data detection using a message passing algorithm (JMPA) method in combination with an active UE detector method, wherein the active UE detector method comprises:
   receiving a list of all potential UEs;
   receiving a plurality of signals transmitted over the time-frequency domain;
   receiving an output, from the JMPA method, comprising an updated list of potential UEs, wherein the updated list includes fewer potential UEs than the list of all potential UEs; and
   creating an active potential UE list in accordance with the plurality of signals and the updated list of potential UEs.

7. The method of claim 1, wherein the grant-free uplink transmission scheme defines a number of unique pilots for grant-free uplink transmissions.

8. The method of claim 1, further comprising:
   before receiving the uplink data transmission, sending, by the BS, a first CTU index to the first UE, wherein the first CTU index uniquely identifies the first CTU in the plurality of CTUs.

9. The method of claim 1, wherein the first CTU is a combination of time, frequency, pilot and signature.

10. A base station (BS) comprising:
    a memory storage comprising instructions; and
    one or more processors in communication with the memory storage, wherein the one or more processors execute the instructions to:
    implement a grant-free uplink transmission scheme, wherein the grant-free uplink transmission scheme:
    defines one or more contention transmission unit (CTU) access regions in a time-frequency domain;
    creates a default CTU mapping scheme by mapping a plurality of CTUs to the one or more CTU access regions, each of the plurality of CTUs being a combination of at least time, frequency and pilot; and
    creates a default user equipment (UE) mapping scheme that pre-maps a first UE to a first CTU in the plurality of CTUs and a second UE to a second CTU in the plurality of CTUs, the second CTU being different than the first CTU;
    receive an uplink data transmission from the first UE on the first CTU that is pre-mapped to the first UE according to the grant-free uplink transmission scheme without using a request/grant mechanism;
    decode the uplink data transmission blindly; and
    indicate, to the first UE, that decoding the uplink data transmission blindly was successful.

11. The BS of claim 10, wherein the one or more processors execute the instructions to further:
send a first CTU index to the first UE before receiving the uplink data transmission, wherein the first CTU index uniquely identifies the first CTU in the plurality of CTUs.

12. The BS of claim 10, wherein each of the plurality of CTUs is defined as a combination of time, frequency, signature, and pilot elements, and the grant-free uplink transmission scheme maps multiple pilot elements to each signature element.

13. The BS of claim 10, wherein the grant-free uplink transmission scheme defines a plurality of CTU access regions, each of the plurality of CTU access regions being configured to provide a type of service to the first UE based on a quality of service (QoS) level of the first UE, a configuration, a subscribed level of service, geometry of the first UE, or a combination thereof.

14. The BS of claim 10, wherein a size of each of the one or more CTU access regions is defined based on an estimated probability of collisions, a number of total collisions over a period of time, a number of UEs supported by the BS, or a combination thereof.

15. The BS of claim 10, wherein a size of each of the plurality of CTUs is defined based on an expected transmission threshold, a desired padding level, a modulation coding scheme (MCS) level, or a combination thereof.

16. The BS of claim 10, wherein the grant-free uplink transmissions scheme creates a default CTU mapping in accordance with goals of distributing potential UEs uniformly over the one or more CTU access regions and reducing a probability of pilot collision.

17. A method comprising:
transmitting, by a first user equipment (UE) to a base station (BS), an uplink data transmission on a first CTU according to an grant free transmission scheme without using a request/grant mechanism, wherein the grant free transmission scheme defines a pre-mapping between the first UE and the first CTU in a plurality of CTUs for uplink data transmissions, a pre-mapping between a second UE and a second CTU in the plurality of CTUs, the second CTU being different than the first CTU, and wherein each of the plurality of CTUs is a combination of at least time, frequency and pilot; and
determining, by the first UE, whether a collision has occurred based on an indication by the BS; and
resolving, by the first UE, the collision using an asynchronous hybrid automatic repeat request (HARQ) method when the UE determines that the collision has occurred.

18. The method of claim 17, wherein the first CTU is a combination of time, frequency, pilot and signature.

19. The method of claim 17, further comprising:
transmitting, by the first UE, a remapping request to the BS using high-level signaling when the UE determines that a number of collisions have occurred and the number of collisions is above a threshold.

20. A first user equipment (UE) comprising:
a memory storage comprising instructions; and
one or more processors in communication with the memory storage, wherein the one or more processors execute the instructions to:
transmit, to a base station (BS), an uplink data transmission on a first CTU according to an grant free transmission scheme without using a request/grant mechanism, wherein the grant free transmission scheme defines a pre-mapping between the first UE and the first CTU in a plurality of CTUs for uplink data transmissions, a pre-mapping between a second UE and a second CTU in the plurality of CTUs, the second CTU being different than the first CTU, and wherein each of the plurality of CTUs is a combination of at least time, frequency and pilot;
determine whether a collision has occurred based on an indication by the BS; and
re-transmit, to the BS, the uplink data transmission using an asynchronous hybrid automatic repeat request (HARQ) mechanism when the first UE determines that a collision has occurred.

21. The first UE of claim 20, wherein the grant free transmission scheme comprises information for determining the first CTU in accordance with a dedicated connection signature (DCS) of the first UE, a DCS index, a total number of CTUs in the grant free transmission scheme, a subframe number, or a combination thereof.

22. The first UE of claim 20, wherein the grant free transmission scheme comprises information for determining a CTU index in accordance with:

$$I_{CTU} = DSC_i \bmod N_{CTU},$$

wherein $I_{CTU}$ is the CTU index, $DSC_i$, is a DCS index assigned to the first UE by the BS, and $N_{CTU}$ is a total number of CTUs in the grant free transmission scheme.

23. The first UE of claim 20, wherein the first CTU is a combination of at least time, frequency, pilot and signature.

* * * * *